(No Model.)
G. A. WATKINS.
WHEEL LOCK FOR BABY CARRIAGES.
No. 495,211. Patented Apr. 11, 1893.
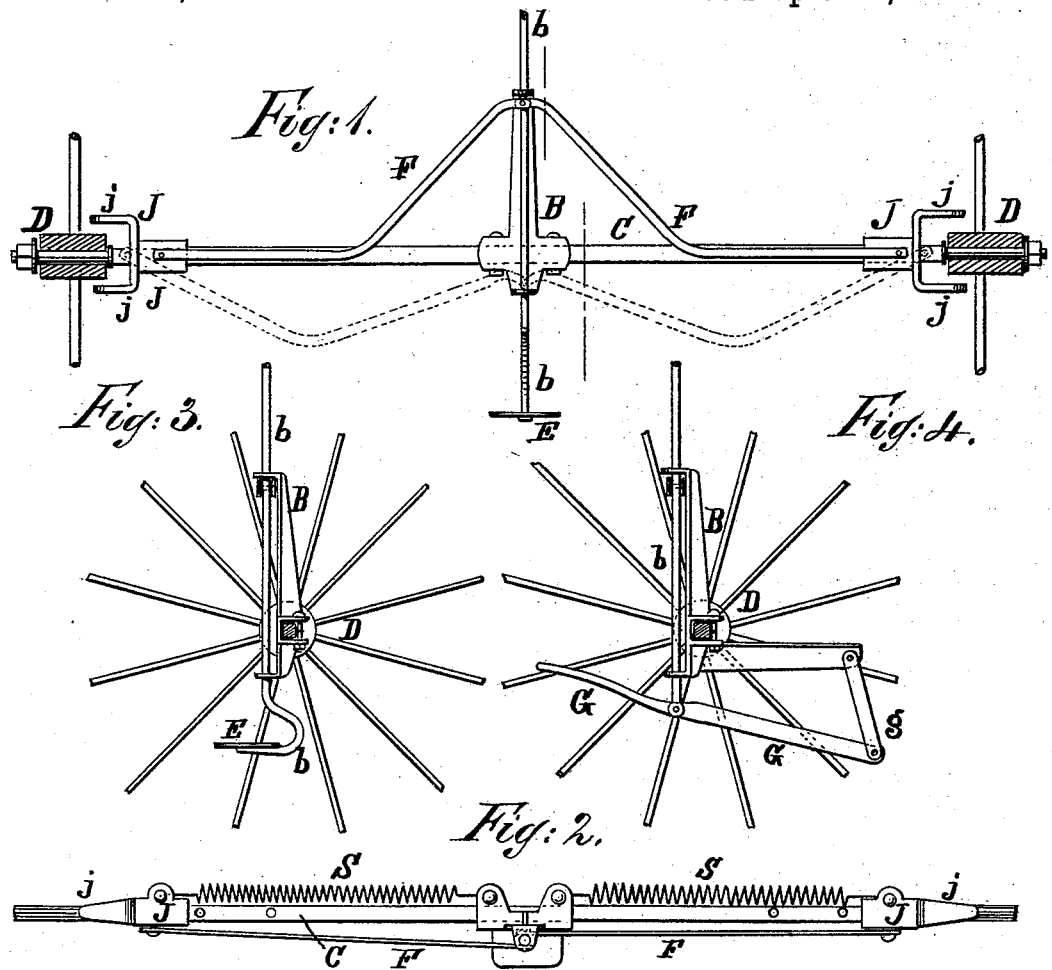
WITNESSES:
INVENTOR
Gardner A. Watkins
BY
ATTORNEY

UNITED STATES PATENT OFFICE.

GARDNER A. WATKINS, OF GARDNER, MASSACHUSETTS.

WHEEL-LOCK FOR BABY-CARRIAGES.

SPECIFICATION forming part of Letters Patent No. 495,211, dated April 11, 1893.

Application filed May 25, 1892. Serial No. 434,307. (No model.)

*To all whom it may concern:*

Be it known that I, GARDNER A. WATKINS, of Gardner, Massachusetts, have invented certain new and useful Improvements in Locks for Baby-Carriages and Like Uses, of which the following is a description, reference being taken to the accompanying drawings, which form part of this specification.

My invention relates particularly to locks or clamps arranged to engage with and to lock the wheels of baby carriages, and it consists of, and is embodied in, a lock or clamp and a pedal movement by which it is operated, and the novel features thereof, constructed, arranged, combined, and used, substantially in the manner and for the purposes, hereinafter described, illustrated and claimed.

In the drawings, Figure 1 is an elevation of the rear axle of a baby carriage provided with my invention. Fig. 2 is a plan view thereof. Fig. 3 is a side elevation partly in section showing my pedal movement. Fig. 4 is a similar view showing a modified form of pedal.

In the figures like letters of reference indicate like parts.

By my invention I simultaneously operate a pair of clamps or locks for both of the hind wheels of a baby carriage by means of a pedal or handle at the center of the rear axle. Projecting arms or dogs are arranged to engage the hubs or spokes of the wheels and are carried upon sliding boxes which surround but travel upon the rear axle. Operating rods are secured to these boxes and extend in toward the center of the axle. At the center I provide a pedal or hand movement to which these rods are attached. By this central actuating movement the boxes may be simultaneously thrust outward or withdrawn and the dogs thereby thrown into or out of engagement with the wheels. To facilitate this operation, I provide one or more springs tending to draw the sliding boxes toward each other, and to withdraw the dogs from the wheel. The springs also serve to hold the dogs as set, and at the same time aid materially in preventing rattling of the loose parts. The hand or pedal movement, which I will term generically my "actuating movement," is so arranged that when the dogs are thrown into engagement with the wheels the inner ends of the operating rods pass the dead center and tend to fly back by the action of the spring. A stop or stops, suitably placed, prevent this and retain the parts in position, so that my springs perform the triple function of holding the dogs in position for engagement or disengagement with the wheels; of assisting in withdrawing the dogs or clamps; and of preventing rattling between the loose parts. The actuating mechanism may be made in several forms other than those which will be set forth in this case. In an application filed by me on the 25th of April, 1891, and serially numbered 430,477 I have set forth and claimed specifically certain other actuating devices. In this present application I desire to secure to myself certain forms not disclosed in the other case, as well as certain broad claims which could not advantageously be made in that case. In the present invention the operating rods are pivotally secured to the sliding boxes, permitting a slight angular motion of the rods. The pedal movement is directly applied to the tips of the rods, forming, in fact, the elbow of a pair of toggles. The springs may be connected directly from one sliding box to the other, or one spring for each box may be used, or a single spring may be secured at each end to pins upon the operating rods. By any of these arrangements a constant force will be exerted upon the rods tending to draw the sliding boxes toward the center of the shaft and to withdraw the dogs from engagement with the wheels.

In Figs. 1, 2, and 3, I show what is perhaps the simplest form of my device.

At B is shown a central bracket within which travels a vertical shaft or rod *b* provided with a step or pedal E at its lower end.

C indicates the shaft and D the wheels of the baby carriage.

At J are shown my sliding boxes which surround and travel upon the shaft C. The arms or dogs *j*, with which these boxes are provided, are arranged to pass between adjacent spokes of the wheels and thereby lock the wheels and prevent rotation.

To effect the proper motion for the boxes, operating rods F are pivotally secured to the boxes and extend to the vertically sliding shaft or rod *b*. When the pedal is in its raised position, these rods occupy the position shown in Fig. 1, the sliding boxes and dogs being withdrawn from the wheels; but when the pedal is depressed the inner ends of the rod, pass downward into line, force the boxes outward and throw the dogs into engagement with the wheels. I provide springs S for each of the boxes, one end of each spring being secured to the brackets D and the other end to one of the boxes J. When the pedal is in its raised position as in the figures the tension of the spring tends to force the inner end of the rod upward and away from the axle and in this manner sustains the pedal in its raised position. When however the pedal is depressed to the limit of its travel the inner ends of the rods are brought downward past the dead center, and into position shown by dotted lines. Here again the tension of the springs tends to drive the inner ends of the rods away from the axle and so holds the parts in place.

Instead of the pedal attached directly to the sliding rod $b$, I may pivotally secure a pedal lever G to the lower end of the rod, as shown in Fig. 4, and fulcrum the rear end of the lever to the end of a link $g$ dependent from a projection upon the bracket B. There are of course many other ways in which the pedal may be connected.

I have now described all the essential features of my invention and set forth the manner in which I simultaneously control and actuate a pair of locks for the wheels of baby carriages.

It is clear that my invention is equally applicable to invalid chairs and many other vehicles and therefore

I claim, broadly, and desire to secure by these Letters Patent, the following:

1. In combination with a wheel and axle, a sliding clutch or lock mounted upon the said axle arranged to lock the said wheel, a stationary bracket B secured to the said axle, a sliding rod $b$ mounted in guides in the said bracket and a connecting rod F secured at one end to the said rod $b$ and at the other end to the said sliding clutch or lock, substantially as, and for the purposes, set forth.

2. In combination in a carriage lock or wheel lock, a sliding rod $b$ for actuating the said lock, mounted in a bracket B secured to the axle of the vehicle, and a pedal lever G secured by a pivot and a link to the said bracket and to the said sliding rod, substantially as, and for the purposes, set forth.

In testimony whereof I have hereunto set my hand this 17th day of May, 1892.

GARDNER A. WATKINS.

Witnesses:
THATCHER B. DUNN,
CHARLES I. DICKERMAN.